(No Model.)
D. J. DUNN.
AUTOMATIC STOVE DAMPER.
No. 312,449. Patented Feb. 17, 1885.
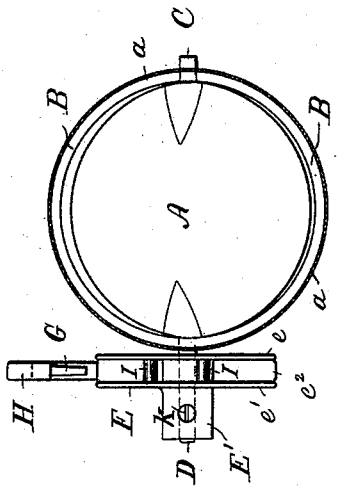
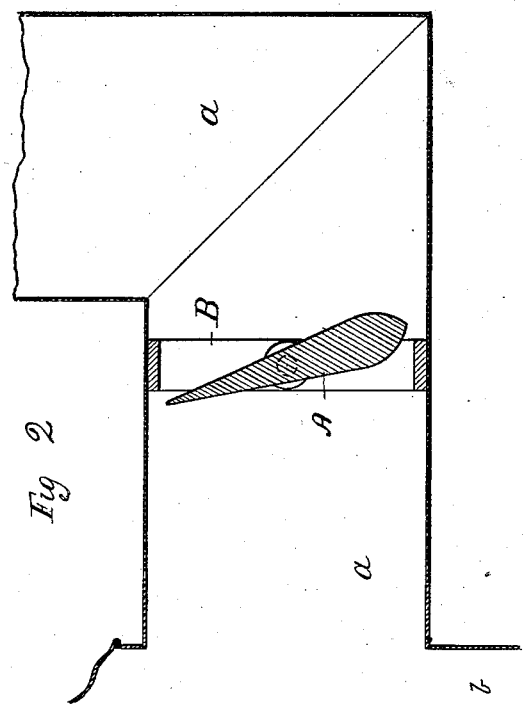
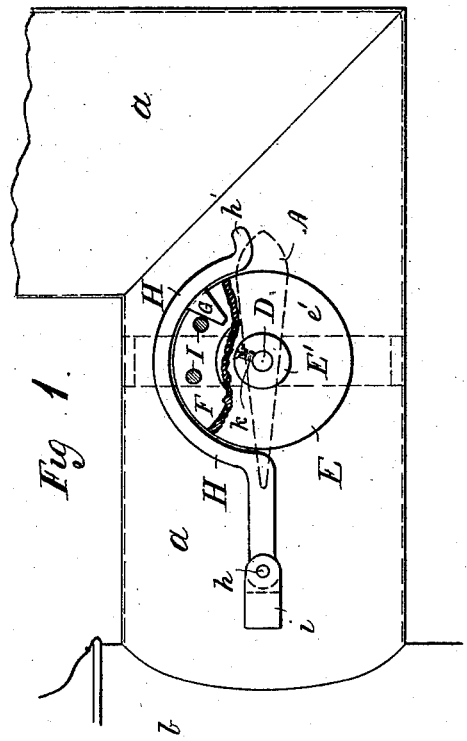
WITNESSES:
John Cook
C. Sedgwick
INVENTOR:
D. J. Dunn
BY Munn & Co.
ATTORNEYS.

UNITED STATES PATENT OFFICE.

DANIEL J. DUNN, OF WEST FITCHBURG, MASSACHUSETTS.

AUTOMATIC STOVE-DAMPER.

SPECIFICATION forming part of Letters Patent No. 312,449, dated February 17, 1885.

Application filed July 3, 1884. (No model.)

*To all whom it may concern:*

Be it known that I, DANIEL J. DUNN, of West Fitchburg, in the county of Worcester and State of Massachusetts, have invented a new and Improved Automatic Stove-Damper, of which the following is a full, clear, and exact description.

The object of my invention is to prevent the burning of buildings from overheated stoves or furnaces.

The invention consists in an automatic damper adapted to close by gravity to cut off the draft from the fire in a stove, heater, or other furnace, and having fusible pins connected to its pivot, together with a detent to act on the fusible pins to hold the damper open more or less, and so as to allow the damper to close when the fusible pins melt.

The invention consists, also, in particular constructions and combinations of parts of the damper, all as hereinafter fully described and claimed.

Reference is to be had to the accompanying drawings, forming part of this specification, in which similar letters of reference indicate corresponding parts in all the figures.

Figure 1 is a side elevation of a portion of a stove and its pipe with my improved damper applied and shown open, and the damper-retaining devices broken away and in section. Fig. 2 is a section through the stove-pipe and damper with the damper closed. Fig. 3 is an end view with the stove-pipe in section.

The letter A indicates the damper-plate, or damper proper, which is shown pivoted to swing in a metal ring or frame, B, and within the stove-pipe $a$, leading from the stove or heater $b$, on pivots C D, one at each side of the damper-plate. The pivot-pin D is prolonged, and on it is placed the head E, which may consist of an inner plate, $e$, and an outer plate, $e'$, with a division-piece, $e^2$, between them, all held together by suitable screws or rivets, or the head may consist of one piece. The central portion of the head is cut away to form a recess, F, between the plates or flanges $e\,e'$, (see Fig. 1,) said space permitting the tooth or prong G on a lever or pawl, H, to enter between the plates, and so that the tooth may be set at the side of any one of a series of plugs or pins, I, which extend across the recess F, and are made of fusible metal or other substance which will melt at any desired predetermined temperature. The lever H is pivoted at $h$ to the side of the stove-pipe $a$, or to a suitable bracket, $i$, fixed thereon, and has a bend or projection, $h'$, at the other or free end, by which it may be lifted away from the head E and its fusible pins I, or be adjusted to engage any one of the pins. The hub E' of the head E receives the pin or screw $k$, by which the head is held so as to turn with the damper, and the hub serves also as a convenient means of turning the damper by the fingers when adjusting it relatively with the fusible pins and the lever. The damper-plate A is made much heavier at one side or edge than the other, so that it will close automatically by its gravity, as in Fig. 2.

As shown in Fig. 1, the damper is set with the tooth G of the lever or pawl H engaging the back fusible pin, I, and thereby holding the damper-plate A fully open, as in dotted lines. Should the stove and its pipe heat up sufficiently to cause the fusible pins I to melt, it is evident that the damper-plate will no longer be held by the tooth G and the damper-plate will close, thereby cutting off the draft through the pipe and allowing the stove to cool down, or putting out the fire therein. By setting the tooth G behind the forward fusible pin, I, the damper-plate A will be held but partly open, and should the stove then become overheated the fusible pin will melt and release the damper-plate, when it will close automatically. The damper may thus be set to give any desired amount of draft according to the weather, and may always be depended on to cut off the draft entirely should the stove and pipe become overheated. As many of the fusible pins I may be placed in the head E as desired, depending on the number of open positions in which it is desired to hold the damper-plate by the toothed lever or pawl H.

I have shown and described my improved automatically-closing damper as applied to a house stove or heater; but it may of course be applied to any style of heating-furnace, and in every case will act to cut off the draft and prevent overheating of the stove, heater, or furnace, and prevent the loss of life and property by the burning of buildings from this cause.

All the parts of the damper are simple, and it may be cheaply made and applied either to old or new stoves.

Having thus described my invention, I claim as new and desire to secure by Letters Patent—

1. A damper made with a fusible pin or pins connected with its pivot, and a detent acting on the pins to hold the damper-plate open and permit it to close when the pins fuse, substantially as described.

2. A damper made with a pivoted damper-plate, A, made heavier at one side, a head, E, provided with fusible pins and fixed to the damper-plate pivot, and a detent for acting on the pins to hold the damper open, substantially as shown and described.

3. A damper made with a pivoted damper-plate, A, made heavier at one side, a head, E, fixed to the damper-pivot, and provided with fusible pins I, and a pivoted lever or pawl, H, having a tooth, G, adapted to engage the pins to hold the damper open, substantially as shown and described.

4. The head E, made with side flanges, $e\ e'$, a recess, F, to receive the detent, and fusible pins I crossing the recess, substantially as shown and described.

DANIEL J. DUNN.

Witnesses:
JAMES FARRELL,
HENRY MILES.